United States Patent [19]

Hampl, Jr. et al.

[11] Patent Number: 4,967,306

[45] Date of Patent: Oct. 30, 1990

[54] HIGH PURITY AROMATIC POLYESTERS

[75] Inventors: Edward F. Hampl, Jr.; Mohammad Iqbal, both of St. Paul, Minn.

[73] Assignee: Minnesota Mining and Manufacturing Company, St. Paul, Minn.

[21] Appl. No.: 348,262

[22] Filed: May 5, 1989

[51] Int. Cl.$^5$ .................. H01G 4/08; C08G 63/02
[52] U.S. Cl. ...................... 361/323; 528/176
[58] Field of Search ............. 361/323; 29/25.42; 528/176

[56] References Cited

U.S. PATENT DOCUMENTS

| | | | |
|---|---|---|---|
| 3,546,165 | 12/1970 | Morgan | 260/47 |
| 4,066,623 | 1/1978 | Besso et al. | 260/47 |
| 4,387,209 | 6/1983 | Rieder et al. | 528/176 |
| 4,401,803 | 8/1983 | Rieder | 528/176 |
| 4,430,493 | 2/1984 | Rieder | 528/179 |
| 4,436,782 | 3/1984 | Chungfah | 428/402 |
| 4,503,266 | 3/1985 | Szabolcs | 568/719 |
| 4,533,511 | 8/1985 | Mark | 264/184 |
| 4,756,064 | 7/1988 | Yoshii et al. | 361/323 X |
| 4,771,362 | 9/1988 | Behn | 361/323 X |
| 4,843,517 | 6/1989 | Maruyama et al. | 361/323 |

FOREIGN PATENT DOCUMENTS

| | | |
|---|---|---|
| 200785 | 6/1988 | Japan . |
| PCT/AT87/-00062 | 10/1987 | PCT Int'l Appl. . |
| 1122201 | 7/1968 | United Kingdom . |

*Primary Examiner*—Donald A. Griffin
*Attorney, Agent, or Firm*—Donald M. Sell; Walter N. Kirn, Jr.; Eloise J. Maki

[57] ABSTRACT

This invention provides oligomer-free polyesters that consist essentially of repeating, interpolymerized units derived from isophthalic acid and/or terephthalic acid, and 9,9-bis-(4-hydroxyphenyl)-fluorene, a process for making such polyesters and articles comprising said polyesters such as electrical capacitors, optical films and fibers.

9 Claims, No Drawings

HIGH PURITY AROMATIC POLYESTERS

BACKGROUND OF THE INVENTION

This invention relates to linear polyesters of the aromatic, dicarboxylic acids terephthalic and isophthalic acid and 9,9-bis-(4-hydroxyphenyl)-fluorene. In a further aspect, it relates to a process for preparing such polyesters.

Interfacial polymerization methods can be desirable alternatives to solution polymerization methods because they may use less organic solvent thereby lowering solvent recovery cost, may provide shorter reaction times than solution polymerization methods, and may permit better control of reaction temperature because water can be a superior heat transfer medium to organic solvents. However, it has been noted that it may be difficult to obtain high molecular weight polymers using this method.

Polyesters of 9,9-bis-(4-hydroxyphenyl)-fluorene and isophthalic or terephthalic acid have been described in the art. U.S. Pat. No. 4,387,209 (Rieder et al.) describes polyesters made by reacting 9,9-bis-(4-hydroxyphenyl)-fluorene with at least one member of the group consisting of isophthalic or terephthalic acid using an interfacial polymerization process. However, Rieder et al. reported that at least some of the polyesters of their invention have a "binodal" molecular weight distribution wherein 10–20% of the polyester weight is comprised of low molecular weight species. Rieder et al. states that the presence of these species increases the adhesive qualities of the polyesters making them more useful in the electrical insulation field. Rieder et al. also teach that the inherent viscosity of the polyester is greatly dependent upon the purity of the monomer and that even relatively small variations in purity of the diphenol monomer can cause large deviations in the inherent viscosity values. Example 2 of U.S. Pat. No. 4,401,803 (Rieder) describes the preparation of polyesters of 9,9-bis-(4-hydroxyphenyl)-fluorene and a 50:50 mixture of isophthalic and terephthalic acid chloride using interfacial polymerization. He precipitates the polyester with an acetone-methanol blend to produce a material with an inherent viscosity of 1.67 dl/g. Neither oligomers nor low molecular weight species are mentioned. U.S. Pat. No. 4,533,511 (Mark) discloses a process for spinning fibers from the polycondensation product of 9,9-bis-(4-hydroxyphenyl)-fluorene and a mixture of isophthalic acid chloride and terephthalic acid chloride. He suggests dichloromethane as the spinning solvent and the liquid precipitant is preferably an aqueous lower alkanol. In one example acetone was used as the precipitant.

U.S. Pat. No. 4,066,623 (Besso et al.) discloses that certain aromatic, halogenated polyesters, which do not include the polyester of this invention, prepared by interfacial polymerization methods, will have bimodal molecular weight distributions. As a result, these polymers will contain a fraction (e.g., about 15 to 20% of the total polymer weight) of species with molecular weights not greater than 8000. Besso et al. states that the presence of these species results in solvent sensitivity of the polymer.

The importance of the molecular weight of the 9,9-bis-(4-hydroxyphenyl)-fluorene/isophthalic and terephthalic acid polyester (hereinafter, for brevity, occasionally referred to as the FPE copolymer) in achieving certain desirable physical properties has been discussed in the art. As noted above, Rieder et al. seems to view the presence of 10 to 20% of oligomeric species as producing an advantagous FPE copolymer property. It appears that only Besso et al. has contemplated, with respect to the polyesters described in their patent, that the presence of oligomeric species could undesirably effect polymer properties. Applicant was the first to note that even presence of small amounts (i.e., between 2 and 10% of total polyester weight) of oligomer species in the FPE copolymer can result in inferior properties. This is true even where the copolymer has a high average molecular weight or high inherent viscosity.

The applicant has determined that small amounts of oligomeric species in the FPE copolymer results in increased solvent sensitivity, lower elongation, poorer tensile strength, poorer chemical resistance, dimensional instability and variation in electrical properties when the material is exposed to high temperatures. Thus the presence of oligomer renders the FPE copolymer unsuitable for many applications such as those in which critical electrical properties must be maintained under high temperature conditions. Dimensional instability and chemical instability renders the material unsuitable for applications wherein the material is thermally printed. Applicant has further determined that the presence of even small amounts of oligomer will make the FPE copolymer sensitive to ultraviolet radiation and unstable under vacuum conditions. Films containing small amounts of oligomer will "yellow" or degrade upon limited exposure to ultraviolet radiation. This greatly limits the use of the film for applications in which the optical properties of the film are important, such as packaging material. Vacuum instability results in weight loss from the copolymer under vacuum conditions. This renders the material unsuitable for applications in which the material will be subjected to high vacuum conditions (e.g. $10^{-6}$ torr), such as applications where vapor deposition or sputtering processes are used.

Applicant has developed a novel 9,9-bis-(4-hydroxyphenyl)-fluorene/isophthalic and terephthalic acid polyester which contains a very low level of oligomeric material and possesses tensile strength, elongation, chemical resistance, temperature stability, ultraviolet resistance and vacuum stability superior to the FPE copolymers containing oligomeric species described in the art. Yet, applicant's copolymer has good adhesion to other materials such as metals having lost none of its "adhesive properties" despite the low level of oligomer present in the copolymer.

SUMMARY OF THE INVENTION

This invention provides polyesters that consist or consist essentially of repeating, interpolymerized units derived from isophthalic acid and/or terephthalic acid, and 9,9-bis-(4-hydroxyphenyl)-fluorene. Said polyesters are oligomer free, that is less than about 2 percent of the polyester weight consists of oligomeric or low molecular weight species. The oligomeric or low molecular weight species are those which have molecular weights of less than about 8000. Preferably the polyesters contain 1 percent or less of the oligomeric species.

The invention further provides a novel interfacial polymerization process for the preparation of the polyesters described above.

DETAILED DESCRIPTION OF THE INVENTION

Some of the polyesters of this invention consist of repeating groups represented by the formula

   (I)

where X is a divalent organic radical derived from either terephthalic or isophthalic acid and each X is independently selected, Y is derived from 9,9-bis-(4-hydroxyphenyl)-fluorene, n is a whole number greater that or equal to 1, and at least 90% by weight of the polyester consists of species wherein n is greater than 20, and preferably is greater than about 200. Applicants have been able to obtain very narrow molecular weight distributions as represented by polydispersivity values of about 2 to 3. The higher the molecular weight, the better for many uses. For most uses, the weight-average molecular weight is at least 500,000, and for other uses it is preferably at least 700,000 or 900,000 or higher.

The polyesters of this invention can be prepared by reacting 9,9-bis-(4-hydroxyphenyl)-fluorene or a functional derivative thereof (e.g., an alkali metal diphenolate such as sodium, potassium, or lithium diphenolate) with at least one acid selected from the group consisting of terephthalic and isophthalic acid, or functional derivatives thereof (e.g., acid halides or anhydrides), in the presence of a phase transfer catalyst, using an interfacial polymerization method.

While interfacial polymerization methods have been used to produce the FPE copolymer, the use of the novel interfacial polymerization method described herein permits production of the oligomer-free FPE copolymer.

The compound, 9,9-bis-(4-hydroxyphenyl)-fluorene, is known in the art and can be prepared according to a procedure similar to that described in U.S. Pat. No. 4,503,266 (Szabolcs), which is herein incorporated by reference. Briefly, the process of preparation comprises reacting phenol and fluorenone in the presence of gaseous hydrogen halide and catalytic amounts of at least one bivalent, trivalent or tetravalent metal halide. The 9,9-bis-(4-hydroxyphenyl)-fluorene used in this invention must be extremely pure, i.e., at least 99.8% pure and preferably 99.9% to 99.95% pure as measured by high pressure liquid chromatography. 9,9-bis-(hydroxyphenyl)-fluorene which is 99.95% pure typically has a melting point of 225.5°-227° C. as measured by differential scanning calorimetry (DSC). The higher the level of ortho-para isomer or dimer or unreacted phenol, the larger the fraction of oligomeric species that will be present in the organic phase from which the final FPE copolymer is precipitated. Generally, the higher the level of oligomeric species in the organic phase prior to precipitation, the higher the fraction of oligomeric species which will result in the FPE copolymer.

Isophthalic and terephthalic acid, acid halides thereof, and anyhydrides thereof are known in the art. For the purposes of this invention, these compounds must be anhydrous, i.e., they must contain no water of hydration or free water. Before using these materials, they should be purified, e.g., by vacuum distilling and using immediately. These compounds must also be at least 99.90% pure as measured by high pressure liquid chromatography, and preferably they are at least 99.95% pure.

In reaction with 9,9-bis(4-hydroxyphenyl)fluroene, the acids or their derivatives may be used individually or as mixtures, and are preferably used in a ratio of 70 to 30% of terephthalic acid to 30 to 70% by weight of isophthalic acid. Most preferably, an equimolar mixture of terephthalic acid and isophthalic acid are employed in this invention.

The phase transfer catalysts suitable for this invention include tertiary amines, tertiary sulfonium salts and quaternary ammonium, phosphonium, and arsonium salts. These compounds are known in the art and are either commercially available or can be synthesized using known methods. The phase transfer catalysts may be used individually or as mixtures, but preferably they are used individually. The phase transfer catalysts need not be as pure as the 9,9-bis-(4-hydroxyphenyl)-fluorene or dicarboxcylic acids, analytical reagent quality is sufficient pure for use in this invention.

Representative phase transfer catalysts suitable for use in this invention include benzyltriethylammonium chloride and tetrabutylammonium iodide and blends thereof. Analytical reagent grade phase transfer catalyst is sufficiently pure for use in this invention.

The alkaline hydroxides include materials which can generate, in admixture with water, a pH of at least ten. The preferred alkaline hydroxides comprise the alkali metal hydroxides, e.g., sodium, lithium, potassium hydroxides. Sodium hydroxide is highly preferred and is employed in a mole ratio of about 2.0 to 3.0 moles of hydroxide per mole of 9,9-bis-(4-hydroxyphenyl)-fluorene, and preferably at a mole ratio of 2.3 moles of hydroxide per mole of 9,9-bis-(4-hydroxyphenyl)-fluorene. Levels of hydroxide above 3.0 moles are discouraged since it merely increases the level of ionic impurity in the organic phase prior to precipitation of the copolymer which must be removed by washing steps. Very high purity of the alkaline hydroxides is not required. Commercially available analytical reagent (AR) quality materials are suitable for use in this invention.

The preferred method of producing the oligomer-free FPE copolymer comprises preparation of a preemulsion mixture comprising the 9,9-bis(4-hydroxyphenyl)-fluorene and phase transfer catalyst. The preemulsion is prepared by making a mixture of 9,9-bis-(4-hydroxyphenyl)-fluorene (at least 99.5% pure), sodium hydroxide, distilled water, and an organic cosolvent such as dioxane or acetone. A 2.3 to 1 molar ratio of sodium hydroxide to 9,9-bis-(4-hydroxyphenyl)-fluorene is employed. The organic cosolvent need not be anhydrous, however if dioxane is used, it must be stripped of peroxide compounds, e.g., passing it through molecular sieve. The resulting mixture is heated to its boiling point, cooled to room temperature, and charged into an appropriate reaction vessel equipped with a high speed stirrer and thermometer. Preferably the reaction vessel is equipped with a cooling jacket. To this stirred mixture, a room temperature solution of the phase transfer catalyst, preferably benzyl triethyl ammonium chloride, dissolved in distilled water is added, followed by a chilled, organic solvent such as 1,2-dichloroethane (DCE) or methylene chloride forming the preemulsion. It is advantageous to chill the organic solvent. To the stirred preemulsion, a mixture containing an equimolar amount of isophthalyl chloride and terephthalyl chloride in an anhydrous, organic solvent such as DCE is added. Stirring is continued while the reaction proceeds. The pH of the reaction mixture should then be adjusted such that it is acidic, preferably to a pH of about 2 to 3. The resulting solution is then allowed to stand until an aqueous phase separates from an organic phase. The organic phase contains the FPE copolymer. Additional DCE may be added if necessary to reduce the solution viscosity to allow stirring. The resulting organic phase is then mixed with approximately an equal volume of deionized water to extract water soluble impurities, such as ionic impurities, from the organic phase. The water and dissolved impurities are allowed to separate from the organic phase and are decanted. This procedure is repeated until the conductivity of the decanted water is 20 μmho or less. After the final washing step, the oligomer-free FPE copolymer is precipitated from the organic phase by stirring into the organic phase an excess (approximately two times the organic phase volume) of an organic solvent with selective solubility, that is an organic solvent in which the oligomeric species are soluble but the polymer is not soluble. The preferred organic solvents for precipitation are the lower ketones containing 3 to 10 carbon atoms, more preferred are those containing 3 to 5 carbon atoms such as methyl ethyl ketone. The most preferred organic solvent for precipitation is acetone. Optionally, the precipitated polymer may be washed with distilled water. The polymers of this invention can be cast into films or coatings using known methods such as dissolving the polymer is an appropriate organic solvent, casting or forming a film of the solution on the desired substrate, evaporating the solvent, and if desired, removing the film from the substrate. The polymers of this invention can be formed into self-supporting films at least as thick as 5 microns. The dissolved polymer can also be coated on to metal foils, wire or other substrates in thicknesses at least as thick as 0.5 micron.

The polymers of this invention have excellent tensile strength and elongation, chemical resistance, moisture resistance, temperature resistance (e.g., nonflammable and dimensional stability to 300° C.), electrical properties (e.g., high volume resistivity, high surface resistivity, high tracking and arc resistance, high dielectric constant, high dielectric strength, and low dissipation factor), ultraviolet resistance, vacuum stability, and exhibit good adhesion to metals. As a result, films or coatings of this material can be used for many applications in which polyimides, such as Kapton TM available from E. I. Dupont deNemours & Company, are currently used. Electrical conductors may be insulated by wrapping the conductor with a film, or with an adhesive-coated film or tape, or by applying a solution of the polymer, (e.g., dissolved in n-methylpyrrolidone, cyclohexanone, or tetrahydrofuran) to the conductor and evaporation the solvent. The coating or film has a high volume resistivity over a wide range of temperatures up to at least 300° C. Film-wound capacitors using film of the invention as the dielectric are especially useful because of their high-temperature capability (to 200° C. or higher), low dissipation factor over the entire temperature range, high dielectric strength and high dielectric constant. Such capacitors can be made by conventional techniques, e.g., winding alternating layers of film of the invention and metallic conductive foils or vapor-depositing metallic conductors onto film of the invention and wrapping such metal-coated films in a spiral. Film of the invention is also especially useful as a substrate for vacuum-deposited coatings such as aluminum, copper, or magnetic recording layers, such chrome-cobalt.

Film of the invention is also useful as a substrate for thermal printing processes. Polyesters of the invention are also useful in optical uses because of a desirable higher index of refraction, low birefringence coefficient, and ability to withstand high temperatures. For example, the polyesters can be used as optical fibers or as cladding for optical fibers. It also can be used in optical recording discs, where its high dimensional stability is of advantage.

Polyesters of the invention are also useful as fibers, e.g., as solution-blown fibers and microfibers or as spun-drawn fibers.

The following non-limiting examples are provided to further illustrate the invention.

EXAMPLE 1

The following example illustrates the method of preparation of the FPE copolymers of this invention. A mixture consisting of 350.0 grams (1.0 mole) of 9,9-bis(4-hydroxyphenyl) fluorene, 92 grams of sodium hydroxide (2.3 mole), 1554 grams of purified p-dioxane, and 3000 grams of distilled water was made by heating the mixture to the boiling point of approximately 70° C. and then cooling to about 25° C. The resulting mixture was charged into a 20 liter vessel that was equipped with a high speed stirrer and thermometer. To this, a room temperature solution of 23 grams of benzyltriethyl ammonium chloride (0.1 mole) dissolved in 200 ml water was added followed by the addition, with stirring, of about 6.6 liters of chilled 1,2-dichloroethane (DCE).

A preemulsion of the bisphenolate mixture described above and the DCE by mixing with the high speed stirrer for about 2–2.5 minutes. The preemulsion mixture was stirred for an additional five minutes. Then a mixture consisting of 101.5 grams isophthalyl chloride, 101.5 grams terephthalyl chloride and 1258.8 grams of anhydrous 1,2-dichloroethane was added slowly over a period of about 2 minutes with stirring. During this time the viscosity of the reaction mixture increased and the temperature rose from about 15° to 17° C. to about 30° C. Stirring continued for an additional 2 minutes. The pH of the mixture is then adjusted to a pH of about 3 to 4 using a 10 weight percent solution of HCl.

The resulting mixture was allowed to stand for about 15 minutes until aqueous and organic phases formed. The aqueous phase was decanted and discarded leaving a viscous organic phase. Approximately 5 liter deionized water was added to the vessel. The mixture was stirred with the high speed stirrer for about 15 minutes and the mixture was then allowed to separate into aqueous and organic phases. The aqueous phase was decanted and discarded. The organic phase was repeatedly washed with deionized water according to the procedure described above until the conductivity of the aqueous phase was 20μmho or less. After the final washing, about 10 liters acetone was slowly added, with stirring, to the remaining organic phase to precipitate the FPE copolymer. The organic phase was filtered to collect the copolymer precipitate and the filtrate was discarded. The copolymer was washed twice with acetone and then washed twice with water. The resulting copolymer was then oven dried at 120° C. for 18 hours.

EXAMPLE 2

Polymer made according to the procedure of Example 1 was compared with polymer made according to a procedure similar of that Example 1 except that the polymer was precipitated from the reaction solution using isopropanol.

Identical weights of the respective polymers were dissolved in tetrahydrofuran. The resulting solutions were analyzed using gel permeation chromatography (GPC). The GPC analysis indicated that the weight average molecular weight of the polymer precipitated using acetone was about 373,000 and the polymer contained essentially no oligomer. The polymer precipitated using isopropanol had a molecular weight of about 273,000 and contained about 15 weight percent oligomer.

Identical weights of each of the polymers were also dissolved in a 60:40 mixture of trichloroethylene:-phenol. The intrinsic viscosities of each solution was then measured at 30° C. The intrinsic viscosity of the polymer precipitated using acetone was 2.29 and the intrinsic viscosity of the polymer precipitated using isopropanol was 1.88.

Approximately 2 mil thick films were cast from the respective polymers. The film cast from the polymer precipitated using acetone had an elongation (measured according to ASTM D882-75) of 50 to 70%, while the film cast from the polymer precipitated using isopropanol had an elongation of only 10 to 20%. Samples of the cast films were exposed to sunlight for about two days. After two days, the films were visually inspected. The film cast from the polymer precipitated using acetone had not yellowed while the film cast from the polymer precipitated using isopropanol had yellowed indicating that the film cast from the polymer of this invention was UV stable. Samples of each of the films were also immersed in acetone at room temperature for about one hour after which the films were visually inspected. The film cast from the polymer precipitated using acetone was insoluble in the acetone while the other film had swelled in the acetone exhibiting cracking. The coefficient linear expansion and the coefficient of humidity expansion was determined for each of the films. The film cast from the polymer precipitated using acetone had a coefficient of linear expansion of 39 to $40 \times 10^{-6}$ m/m ° and a coefficient of humidity expansion of $7.9 \times 10^{-6}$ /%RH. The other film had a coefficient of linear expansion of $70 \times 10^{-6}$ m/m ° and a coefficient of humidity expansion of 9.3 to $12 \times 10^{-6}$ /%RH. Indicating that the film made from the polymer precipitated using acetone was more dimensionally stable and more hydrophobic or less reactive with water.

Various modifications and alterations of this invention will become apparent to those skilled in the art without departing from the scope and spirit of this invention, and it should be understood that this invention is not limited to the illustrative embodiments set forth herein.

We claim:

1. A film-wound capacitor including layers of film that comprises oligomer-free polyester consisting essentially of repeating interpolymerized units derived from isophthalic acid and/or terephthalic acid and 9,9-bis-(4-hydroxyphenyl)-fluorene interleaved with metallic conductor layers.

2. The capacitor of claim 1 wherein the 9,9-bis-(4-hydroxyphenyl)-fluorene has a polydispersivity of about 2 to 3.

3. The capacitor of claim 1 wherein the 9,9-bis-(4-hydroxyphenyl)-fluorene has a weight-average molecular weight of at least 700,000.

4. The capacitor of claim 1 wherein the 9,9-bis-(4-hydroxyphenyl)-fluorene has a weight-average molecular weight of at least 900,000.

5. The capacitor of claim 1 wherein the 9,9-bis-(4-hydroxyphenyl)-fluorene contains one percent or less of oligomeric species.

6. The capacitor of claim 1 wherein the film is at least 5 microns thick.

7. The capacitor of claim 1 wherein film is solution-coated onto the metallic conductor layer.

8. The capacitor claim 1 wherein the 9,9-bis-(4-hydroxyphenyl)-fluorene has a polydispersivity of about 2 to 3, a weight-average molecular weight of at least 700,000 and contains one percent or less of oligomeric species.

9. The capacitor of claim 1 in which the metallic conductor layer is vapor-deposited onto the film.

* * * * *

UNITED STATES PATENT AND TRADEMARK OFFICE
CERTIFICATE OF CORRECTION

PATENT NO. : 4,967,306

DATED : OCTOBER 30, 1990

INVENTOR(S) : EDWARD F. HAMPL, JR., ET AL.

It is certified that error appears in the above-identified patent and that said Letters Patent is hereby corrected as shown below:

Col. 3, line 13, "greater than" should be --than--.

Col. 4, line 15-16, "sufficient" should be --sufficiently--.

Column 8:

Claim 2, line 1, after "the" insert --polyester consisting essentially of repeating interpolymerized units derived from isophthalic acid and/or terephthalic acid and--.

Claim 3, line 1, after "the" insert --polyester consisting essentially of repeating interpolymerized units derived from isophthalic acid and/or terephthalic acid and--.

Claim 4, line 1, after "the" insert --polyester consisting essentially of repeating interpolymerized units derived from isophthalic acid and/or terephthalic acid and--.

UNITED STATES PATENT AND TRADEMARK OFFICE
CERTIFICATE OF CORRECTION

PATENT NO. : 4,967,306

Page 2 of 2

DATED : OCTOBER 30, 1990

INVENTOR(S) : EDWARD F. HAMPL, JR., ET AL.

It is certified that error appears in the above identified patent and that said Letters Patent is hereby corrected as shown below:

Column 8:

Claim 5, line 1, after "the" insert --polyester consisting essentially of repeating interpolymerized units derived from isophthalic acid and/or terephthalic acid and--.

Claim 8, line 1, after "the" insert --polyester consisting essentially of repeating interpolymerized units derived from isophthalic acid and/or terephthalic acid and--.

Signed and Sealed this

Twenty-seventh Day of October, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,967,306

DATED : OCTOBER 30, 1990

INVENTOR(S) : EDWARD F. HAMPL, JR., ET AL.

It is certified that error appears in the above-identified patent and that said Letters Patent is hereby corrected as shown below:

Col. 3, line 13, "that" should be --than--.

Col. 4, line 15-16, "sufficient" should be --sufficiently--.

Col. 8,

Claim 2, line 1, after "the" insert --polyester consisting essentially of repeating interpolymerized units derived from isophthalic acid and/or terephthalic acid and--.

Claim 3, line 1, after "the" insert --polyester consisting essentially of repeating interpolymerized units derived from isophthalic acid and/or terephthalic acid and--.

Claim 4, line 1, after "the" insert --polyester consisting essentially of repeating interpolymerized units derived from isophthalic acid and/or terephthalic acid and--.

UNITED STATES PATENT AND TRADEMARK OFFICE
CERTIFICATE OF CORRECTION

PATENT NO. : 4,967,306

DATED : OCTOBER 30, 1990

INVENTOR(S) : EDWARD F. HAMPL, JR., ET AL.

It is certified that error appears in the above-identified patent and that said Letters Patent is hereby corrected as shown below:

Claim 5, line 1, after "the" insert --polyester consisting essentially of repeating interpolymerized units derived from isophthalic acid and/or terephthalic acid and--.

Claim 8, line 1, after "the" insert --polyester consisting essentially of repeating interpolymerized units derived from isophthalic acid and/or terephthalic acid and--.

This certificate supersedes Certificate of Correction issued October 27, 1992.

Signed and Sealed this

Twenty-sixth Day of January, 1993

Attest:

STEPHEN G. KUNIN

*Attesting Officer*   *Acting Commissioner of Patents and Trademarks*